Patented Aug. 14, 1945

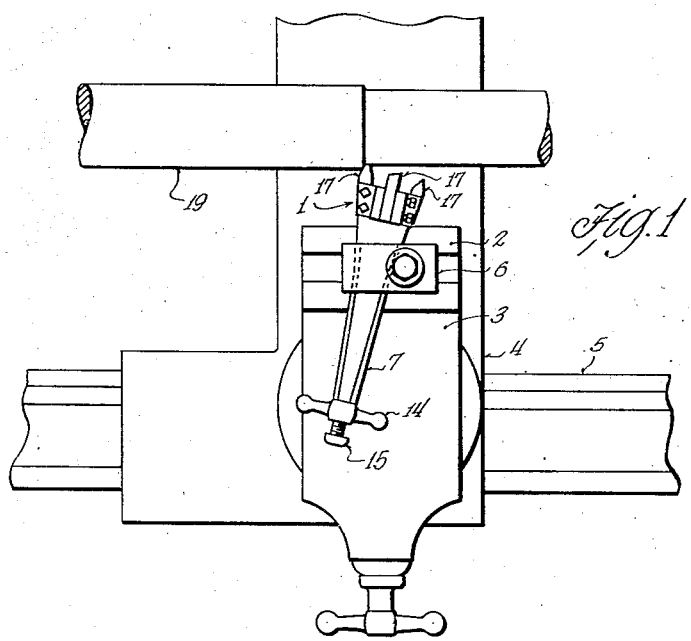
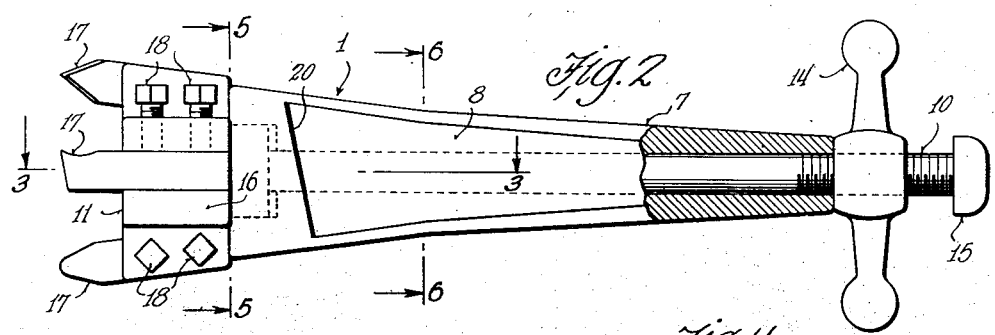
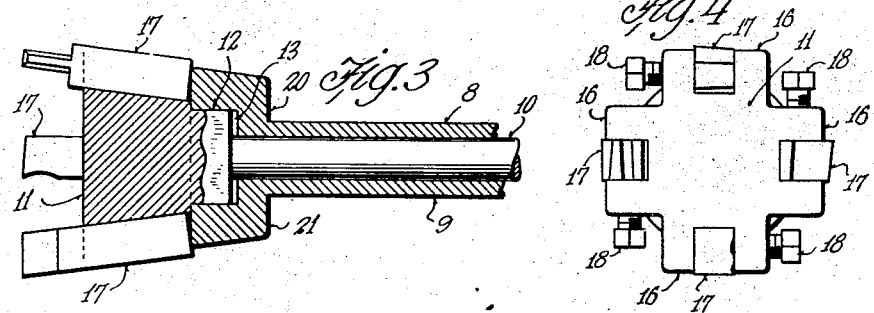
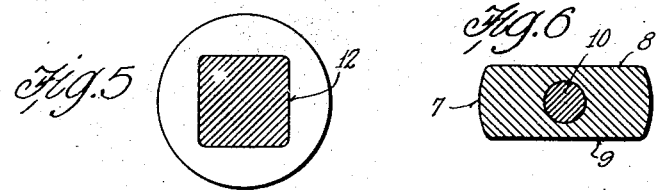
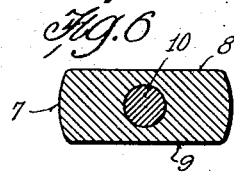

2,382,106

UNITED STATES PATENT OFFICE 2,382,106

MULTIPLE BIT TOOLHOLDER

Karl P. Schoeppner, Milwaukee, Wis.

Application December 7, 1942, Serial No. 468,090

2 Claims. (Cl. 29—48)

This invention relates to tool holders for use upon machine tools, for example lathes, in which a bit is held against a work piece, which has a movement relative to the bit, and it consists of an improvement in tool holders heretofore employed for this purpose in which a plurality of bits ground for specialized purposes, such as roughing, finishing, cutting off and threading are so mounted in said tool holder that any one of them may be brought into working position by a simple operation while the remaining bits are held free of the work to a degree not heretofore attainable.

One object of this invention is to provide a tool holder which permits a more rapid and efficient operation of a machine tool.

Another object of this invention is to provide a tool holder of such versatility as to supplant a plurality of tool holders and thus to effect a greater economy in the tooling of machine tools.

Another object of this invention is to provide a tool holder which will facilitate repetitive manufacture and thus aid in producing a greater uniformity in a series of identical pieces.

The above and other advantages and objects of this invention will be apparent from the description which follows, in which there is set forth by way of illustration and not of limitation, and with the aid of the accompanying drawing which forms a part hereof, one specific instance of an embodiment of this invention.

In the drawing:

Fig. 1 is a plan view showing the tool holder of this invention mounted upon the slide rest of a lathe in engagement with a work piece shown in fragmentary form;

Fig. 2 is an enlarged detail plan view partly in section of the tool holder shown in Fig. 1;

Fig. 3 is a fragmentary view in elevation and in section of the working end of the tool holder shown in Fig. 2 viewed through the plane 3—3 indicated in Fig. 2;

Fig. 4 is a view in end elevation of the tool holder shown in Fig. 2;

Fig. 5 is a view in end elevation and in section viewed through the plane 5—5 indicated in Fig. 2; and Fig. 6 is a view in end elevation and in section of the tool holder shown in Fig. 2 viewed through the plane 6—6 indicated in Fig. 2.

Referring now to the drawing and particularly to Fig. 1, the tool holder of this invention is designated generally by the numeral 1, the same being shown mounted upon the tool post holder 2 of the cutting feed portion 3 of a conventional compound slide rest 4 carried upon lathe ways 5 shown in fragmentary form. A simple tool post clamp 6 serves to hold the tool holder 1 securely in place.

The tool holder 1 shown in greater detail in the remaining figures is made up of a body portion 7 of elongated generally conical shape having flattened upper and lower surfaces 8 and 9. The body 7 contains a longitudinal central bore for accommodating a clamping shank 10. The clamping shank 10 is threaded at its right hand end as seen in Fig. 2 and is integrally attached to a bit mounting 11 at its left hand end. The bit mounting 11 is provided at its inner face at the point of attachment of the shank 10 with a squared boss 12 received within a complimentary socket 13 in the end of the body 7.

The end of the shank 10 extends beyond the body 7 and carries in threaded engagement therewith a hand clamping nut 14 by which the boss 12 may be drawn into the socket 13, thus holding the bit mounting 11 immovable with respect to the body 7 in any one of four selected positions angularly displaced from one another by 90°. Secured to the end of the shank 10 is a cap 15, which when the end nut 14 is backed away can be tapped lightly to dislodge the boss 12 from the socket 13 when it is desired to change the position of the bit mounting 11.

As shown more clearly in Fig. 4 the bit mounting 11 is provided with four bit clamping jaws 16 disposed at right angles to one another, arranged to accommodate an assortment of cutting bits 17 held in place by clamping screws 18. As more clearly appears in Figs. 2 and 3 the seats of the clamping jaws 16 are inclined with respect to the axis of the shank 10. The purpose of this inclination appears from a consideration of Fig. 1, in which the mounting relationship of the tool holder to a work piece 19 appears. In this way a single bit 17 may be brought into working contact with the work while the remaining bits 17 are in a position which clears the work. In order to obtain this relationship the body 7 of the tool holder 1 is secured upon the slide rest 4 in a position inclined with respect to the axis of the work piece by an amount substantially equal to the inclination of the seats in the bit holder 11. To facilitate the obtaining of the proper positioning of the body 7, the flattened faces 8 and 9 terminate in inclined ledges 20 and 21 which can be brought into engagement with the tool post clamp 6.

In operation in a typical instance, the tool holder of this invention furnished with an assortment of bits as shown in the several figures of the drawing may be mounted as shown in Fig. 1. Assuming that the operation to be performed comprises the reduction of a rough piece into the form of a finished shaft with a threaded end, the tool holder is adjusted to first bring the roughing bit into working position as shown in Fig. 1. As the work progresses and the several operations required are successively performed, the end clamping nut 14 is released and the bit mounting 11 is rotated to bring the desired tool into position. This operation is extremely simple and avoids the necessity for replacing the tool holder each time a different shaped bit is required. There is thus a considerable saving in the amount of material employed in the necessary assortment of tools. Furthermore, once a set up has been made and several identical pieces are to be produced, the proper alignment of the several tools required remains set and the operator's time normally involved in insuring proper alignment of tools is saved.

That which I claim as my invention is:

1. In a multiple bit tool holder, the combination comprising a body portion adapted for mounting upon a tool post said body portion being provided with parallel upper and lower flat faces terminating in transverse oblique positioning ledges, said body being provided with a longitudinal bore terminating in a polygonal socket at one end of said body, an adjustable bit mounting having a shank disposed within said bore and having a polygonal boss of shape and size complementary to said socket receivable therein for locating said mounting in a plurality of predetermined angularly spaced positions with respect to said body, a nut on said shank for locking said mounting, and bit securing means forming a part of said adjustable bit mounting adapted to secure bits thereto to form therewith a rigidly associated assembly of bits and bit mounting capable of adjustable movement with respect to said body portion without relative movement between said bits and said bit mounting said bit securing means being disposed so as to hold bits in positions corresponding to the positions of adjustment of said bit mounting with respect to said body.

2. In a multiple bit tool holder, the combination comprising a body portion adapted for mounting upon a tool post said body portion being provided with parallel upper and lower flat faces terminating in transverse oblique positioning ledges, said body being provided with a longitudinal bore terminating in a polygonal socket at one end of said body, an adjustable bit mounting having a shank disposed within said bore and having a polygonal boss of shape and size complementary to said socket receivable therein for locating said mounting in a plurality of predetermined angularly spaced positions, and means forming a part of said mounting for securing bits thereto in inclined relation to the axis of said shank adapted to form between said bits and mounting a rigidly associated assembly of bits and bit mounting capable of adjustable movement with respect to said body portion without relative movement between said bits and said bit mounting said means for securing bits being disposed so as to hold bits in positions corresponding to the positions of adjustment of said bit mounting with respect to said body.

KARL P. SCHOEPPNER.